United States Patent
Arnold et al.

(10) Patent No.: US 10,705,629 B1
(45) Date of Patent: Jul. 7, 2020

(54) CUSTOMIZABLE CONTROL SYSTEM

(71) Applicant: Apple Inc., Cupertino, CA (US)

(72) Inventors: Peter M. Arnold, Cupertino, CA (US); Brenton A. Baugh, Los Altos Hills, CA (US); Brian T. Gleeson, Mountain View, CA (US); David Bloom, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 32 days.

(21) Appl. No.: 15/599,341

(22) Filed: May 18, 2017

Related U.S. Application Data

(60) Provisional application No. 62/370,341, filed on Aug. 3, 2016.

(51) Int. Cl.
| | |
|---|---|
| *G06F 3/0362* | (2013.01) |
| *G09G 5/10* | (2006.01) |
| *G06F 3/044* | (2006.01) |
| *G06F 3/03* | (2006.01) |

(52) U.S. Cl.
CPC .......... *G06F 3/0362* (2013.01); *G06F 3/0312* (2013.01); *G06F 3/044* (2013.01); *G09G 5/10* (2013.01); *G09G 2330/02* (2013.01); *G09G 2354/00* (2013.01); *G09G 2360/145* (2013.01)

(58) Field of Classification Search
CPC ...... G06F 3/0362; G06F 3/044; G06F 3/0312; G09G 5/10; G09G 2330/02; G09G 2354/00; G09G 2360/145
See application file for complete search history.

(56) References Cited

U.S. PATENT DOCUMENTS

| | | | |
|---|---|---|---|
| 5,936,613 A | 8/1999 | Jaeger et al. | |
| 6,140,987 A | 10/2000 | Stein et al. | |
| 6,642,919 B1 | 11/2003 | Jaeger et al. | |
| 7,295,135 B2 | 11/2007 | Younkin | |
| 7,887,222 B2 | 2/2011 | Fanfa et al. | |
| 8,576,199 B1 | 11/2013 | Pryor | |
| 9,261,986 B2 * | 2/2016 | Kumazawa | G06F 3/038 |
| 2004/0178989 A1 | 9/2004 | Shahoian et al. | |
| 2008/0129707 A1 | 6/2008 | Pryor | |

(Continued)

FOREIGN PATENT DOCUMENTS

WO WO-2016079930 A1 * 5/2016 ............. B60R 16/02

*Primary Examiner* — Rodney Amadiz
(74) *Attorney, Agent, or Firm* — Treyz Law Group, P.C.; G. Victor Treyz; David K. Cole

(57) ABSTRACT

A system is provided that includes a display or other support surface to which a repositionable control device may be removably mounted. The display may emit light. The repositionable control device may be a repositionable knob that has light sensors. The display may be directed to emit the light in a predetermined time-varying search pattern while the light sensors make measurements of the emitted light. The repositionable knob may wirelessly transmit the light sensor measurements to control circuitry associated with the display. The control circuitry may process the light sensor measurements or other sensor measurements to determine the location of the repositionable control device on the display. Visible tick marks or other scale information may be displayed around the periphery of the knob. An electromagnetic actuator may provide adjustable detents. Wireless power may be received by the knob.

18 Claims, 7 Drawing Sheets

(56) References Cited

U.S. PATENT DOCUMENTS

| | | | |
|---|---|---|---|
| 2010/0182137 A1 | 7/2010 | Pryor | |
| 2010/0259375 A1* | 10/2010 | Ferren | B60K 35/00 |
| | | | 340/462 |
| 2011/0032203 A1 | 2/2011 | Pryor | |
| 2011/0272884 A1* | 11/2011 | Kraegeloh | A63F 3/00 |
| | | | 273/237 |
| 2013/0113465 A1 | 5/2013 | Padilla | |
| 2015/0070319 A1* | 3/2015 | Pryor | G06F 3/0425 |
| | | | 345/175 |
| 2015/0277592 A1* | 10/2015 | Nishigaki | H02J 50/10 |
| | | | 345/173 |
| 2016/0349863 A1* | 12/2016 | Wei | G06F 3/03545 |
| 2017/0250037 A1* | 8/2017 | Tanaka | B60R 16/02 |

\* cited by examiner

CUSTOMIZABLE CONTROL SYSTEM

This application claims the benefit of provisional patent application No. 62/370,341, filed Aug. 3, 2016, which is hereby incorporated by reference herein in its entirety.

FIELD

This relates generally to controls for systems, and, more particularly, to customizable controls.

BACKGROUND

Electronic equipment and other systems often contain buttons and knobs. A user of such as system may turn a knob to adjust a system parameter. For example, a user may turn a volume knob on a device with a speaker to increase the volume of sound being provided by the speaker. This type of control arrangement may be satisfactory in some circumstances, but is inflexible and does not allow the placement or function of the knob to be customized.

SUMMARY

A system may be provided that includes a display or other support surface to which a repositionable control device may be removably mounted. The display may emit light. The repositionable control device may be a repositionable knob. Visible tick marks or other scale information may be displayed around the periphery of the knob by the display.

The repositionable knob may have a housing with magnets that magnetically mount the repositionable knob to the display. The repositionable knob may also have a rotating portion and an encoder that measures the angular orientation of the rotating portion relative to the housing.

Light sensors may be provided in the housing. The display may be directed to emit light in a predetermined search pattern while the light sensors in the knob make measurements of the emitted light. The repositionable knob may wirelessly transmit light sensor measurements to control circuitry associated with the display. The control circuitry may process light sensor measurements or other sensor measurements to determine the location of the repositionable knob on the display.

The control circuitry may adjust media playback operations, climate control settings, lighting settings, or other system operating parameters based on rotation of the knob and information on the location of the repositionable knob on the display. Tick marks and other visible scale information for the knob may also be updated based on knob location.

An electromagnetic actuator in the knob may be used to provide the knob with adjustable detents. Wireless power may be transmitted to the knob and received by wireless power receiver circuitry in the knob. The knob may have a transparent window through which text or other content on the display may be viewed.

DETAILED DESCRIPTION

Figure 1:
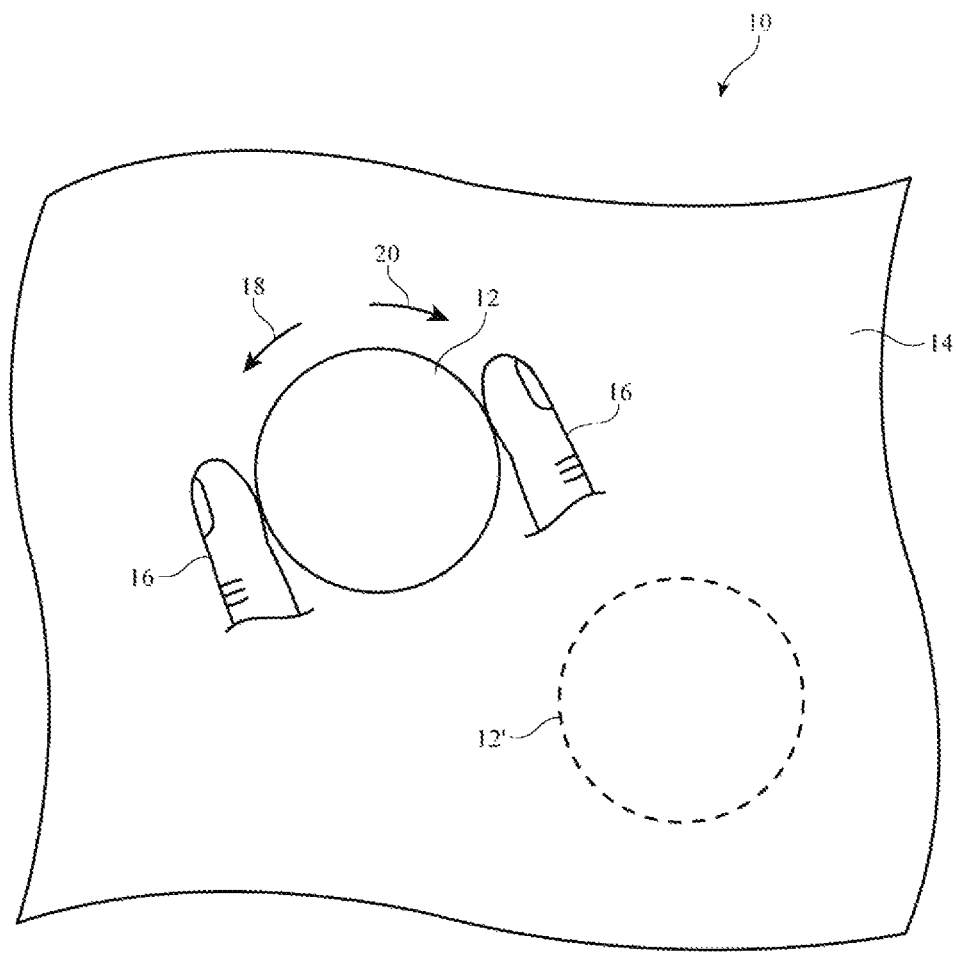
FIG. 1 is a view of an illustrative repositionable control device such as a repositionable rotary knob that has been placed on the surface of a display in accordance with an embodiment.

A user may control a system using input devices such as repositionable control knobs and other repositionable control devices. FIG. 1 is a view of an illustrative system with a repositionable control device. One or more repositionable control devices such as repositionable control device 12 may be removably attached to a surface of a display or other supporting surface. In the example of FIG. 1, repositionable control device 12 is a knob that has been placed on the surface of display 14. If desired, repositionable control device 12 may be removably attached to other structures in system 10 such as a wall or other structure in the interior of a home, vehicle, office, or other environment, an exterior wall surface, a surface of an electronic device such as a computer housing or the housing of a monitor, a surface of a cabinet or appliance such as a refrigerator or stove, or other suitable structure. Illustrative configurations in which repositionable control devices are removably mounted on the surfaces of displays in electronic devices in environments such as homes, offices, vehicles, and other systems may sometimes be described herein as an example.

Repositionable control devices such as device 12 of FIG. 1 may, in general, be sliding controls, toggling controls, pushbutton controls, touch controls, rotary controls, controls with combinations of sliding movement, rotational movement, toggling movement, and/or other types of movement, and/or other suitable devices that serve to gather input and/or provide output to a user. Illustrative configurations of the type shown in FIG. 1 in which repositionable control device 12 is a repositionable rotatable knob that can be rotated by a user may sometimes be described herein as an example. Other types of repositionable control device may be used in system 10, if desired.

As shown in the example of FIG. 1, knob 12 may be rotated by a user. For example, a user may use fingers 16 to grasp and rotate knob 12 in clockwise direction 20 and/or counterclockwise direction 18. The rotation of knob 12 may be used to control the operation of system 10. For example, knob 12 may be used to adjust a media playback function such as a media playback volume, may adjust the temperature of a thermostat, may control the selection of tracks in a music library, may adjust between different screens in a system that has multiple operating modes, or may be used in adjusting other system operating parameters. Because knob 12 is prominent and is raised above the surface of display 14, the presence of knob 12 may help a user interact with system 10 in an intuitive manner.

Magnets or other attachment mechanisms (sticky surfaces, suction cups, interlocking engagement features, vacuum suction, etc.) may be used in temporarily mounting knob 12 in a desired position on display 14. Configurations in which magnetic attraction is used to magnetically mount knob 12 to display 14 may sometimes be described herein as an example. The location at which knob 12 is attached to display 14 may be adjusted by a user. The user may, for example, detach knob 12 from its current position on display 14 and may replace knob 12 on display 14 in a different location such as location 12' (as an example).

Figure 2:
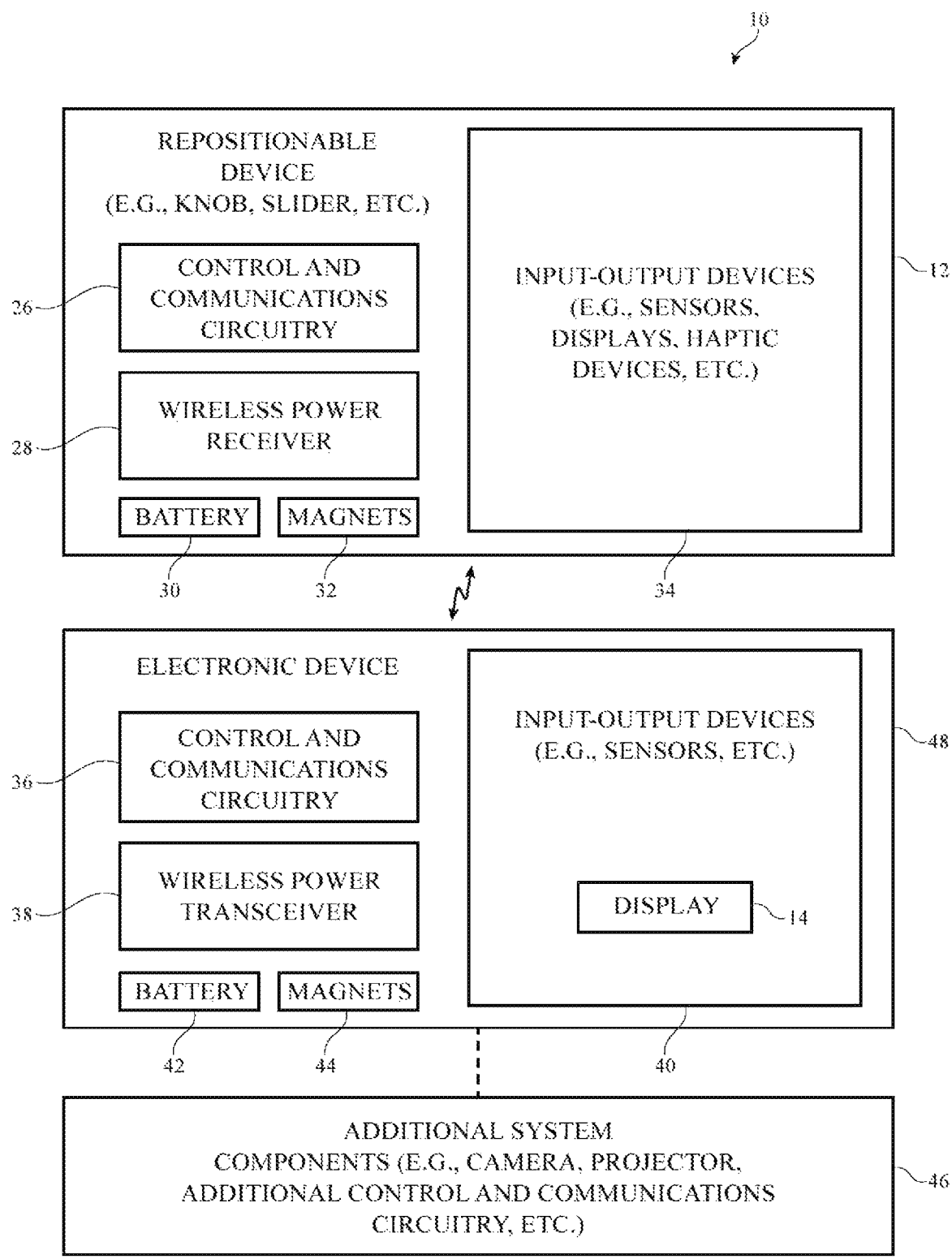
FIG. 2 is a schematic diagram of illustrative components in a system with a repositionable control device in accordance with an embodiment.

Illustrative components of the type that may be included in system 10 are shown in FIG. 2. As shown in FIG. 2, system 10 may include a repositionable device such as knob 12 or other suitable repositionable control device. A user may place knob 12 in a desired location on a display, wall, housing structure, and/or other suitable support structure. A user may, for example, place knob 12 in a desired location on the surface of display 14 in electronic device 48. Device 48 may be a stand-alone device such as a stand-alone tablet computer or may form part of embedded equipment in system 10 (e.g., part of a display on a dashboard, part of a tablet computer display or other display device mounted to a wall in a building, etc.). Configurations in which system 10 contains one or more repositionable devices such as a repositionable knob and in which the structure that supports the knob is a display such as display 14 in system equipment such as device 48 may sometimes be described herein as an example. Other types of devices and supporting structures may be used in system 10, if desired.

Display 14 may be a liquid crystal display, an organic light-emitting diode display, a plasma display, an electrophoretic display, a microelectromechanical systems display, an electrowetting displays, a display with an array of crystalline semiconductor light-emitting diode dies, and/or other types of display. Display 14 may be incorporated into a system such as electronic device 48 or other equipment. Electronic device 48 may be a tablet computer, may be a cellular telephone, may be a laptop computer, may be a monitor or other equipment mounted on a wall in a building, may be a system in a vehicle (e.g., dashboard equipment, etc.), may be a system in an office, or may be other suitable electronic equipment. In additional to display 14, electronic device 48 may include other input-output devices 40. Input-output devices 40 may be used by device 48 to gather input from a user and from the environment surrounding device 48 and to provide output to a user and external equipment. Examples of input-output devices that may be included in device 48 include ambient light sensors, proximity sensors, force sensors, touch sensors, magnetic sensors, gyroscopes, accelerometers, gas sensors, pressure sensors, temperature sensors, touch sensors, buttons, keyboards, microphones, image sensors, speakers, haptic output devices, and light-emitting diodes. Device 48 may include a battery such as battery 42 and/or may be powered from an alternating-current (AC) source and/or non-battery direct-current (DC) source. Magnets 44 may be included in device 48 to help hold knob 12 in place on device 48. Magnets 44 may include permanent magnets and electrically controllable magnets (electromagnets).

Device 48 may form part of a system in a building, may form part of a system in a vehicle, may form part of a computer system, may form part of a home multimedia system, may be a tablet computer, laptop computer, cellular telephone, or other electronic device, or may be part of any other suitable system. As shown FIG. 2, system 10 may include additional system components 46 in addition to the components of device 48. Additional system components 46 that may be used in a system with the equipment of device (system) 48 include external cameras, projectors, control and communications circuitry, vehicle controls (e.g., when display 14 is incorporate into a vehicle), media playback equipment (monitors, speakers, amplifiers, tuners, etc.), climate control equipment (e.g., fans, heating and cooling equipment, etc.), lighting equipment (e.g., lighting controllers), or other suitable electrical components that are controlled by control circuitry in device 48 and/or device 12.

Electronic device 48 may have a wireless power transmitter such as wireless power transmitter 38. Transmitter 38 may have a coil or other component that transmits alternating current electromagnetic signals to a receiving component such as a receiving coil in wireless power receiver 28 of knob 12. This allows wireless power to be provided from device 48 to knob 12 to power the circuitry of knob 12. Knob 12 may also be powered using battery 30. Magnets 32 in knob 12 may be used to magnetically couple knob 12 to display 14. For example, magnets 32 may be magnetically attracted to magnets 44 that have been mounted behind display 14, thereby holding knob 12 in place on the surface of display 14.

Electronic device 48, additional system components 46, and/or repositionable knob 12 may include control and communications circuitry (e.g., knob communications and control circuitry 26 of knob 12, electronic device communications and control circuitry 36 of device 48, and communications and control circuitry in system components 46). This communications and control circuitry may include communications circuitry for supporting serial and/or parallel wired communications (digital and/or analog) between knob 12, device 48, and/or system components 46. The communications circuitry may also support wireless communications (e.g., using Bluetooth® communications protocols, WiFi® communications protocols, other wireless local area network communications protocols, cellular telephone protocols, near-field communications protocols, etc.). The communications and control circuitry of system 10 may include control circuitry that is used to run software and thereby support the operation of system 10. The control circuitry may include storage such as electrically erasable programmable read only memory, random-access memory, hard-disk drives, removable storage media, and other storage devices. The control circuitry may also include processors such as microprocessors, microcontrollers, digital signal processors, baseband processors, application-specific integrated circuits, and/or other processing circuitry.

During operation of system 10, software may be loaded on the control circuitry. The software may contain code (instructions) that is stored in non-transitory storage in the control circuitry. The code may be used to configure the control circuitry of system 10 to perform operations related to gathering input from input-output devices in system 10, to perform operations related to supplying output with input-output devices in system 10, to perform operations related to supporting communication between system components 46, the input-output devices and other components of device 48 and/or the components of knob 12. As an example, software running on the control circuitry of system 10 may configure the control circuitry of system 10 to gather rotational information from knob 12 such as rotational position (angular orientation), rotational velocity, rotational acceleration, rotational direction and to use this knob information or other suitable user input from knob 12 to take suitable actions (e.g., to control the operation of media playback operations, climate control operations, lighting control operations, and other operations in system 10).

Knob 12 may include input-output devices 34 (e.g., input-output devices such as input-output devices 40). For example, a touch screen display or other display may be included in knob 12 to display text, icons, status indicator patterns, and other information. Knob 12 may also use sensors to help monitor the location of knob 12 on display 14 and/or to help monitor the rotation of knob 12. Electromagnets (electromagnetic actuators), motors, and/or other actuators in devices 34 and/or other haptic output devices may be used to create detents (localized resistance to rotation) for knob 12. The electromagnets or other electromagnetic devices may be used to adjust the strength of the detents. Detent strength may be adjusted based on user input, in accordance with default settings, based on information about the status of system 10, based on environmental input (e.g., measured amounts of light, heat, noise etc.), and/or may be adjusted based on other suitable criteria. If desired, knob 12 may be locked with the electromagnets and/or other locking structures to prevent rotational movement of knob 12.

A display in knob 12 may be used in displaying information on the status of knob 12 and/or other operational components within system 10 (e.g., in scenarios in which knob 12 is mounted on a wall in a home or office or vehicle surface without a display). An array of light-emitting status indicator lights and/or other output components may also be used to display information on the status of knob 12 and/or other operational components within system 10.

In scenarios in which knob 12 is mounted on a display such as display 14, display 14 may display information on the status of knob 12 and/or other operational components within system 10. Consider, as an example, the arrangement of FIG. 3. In the illustrative configuration of FIG. 3, knob 12 has an inner disk portion 12-1 and a rotatable outer ring portion 12-2. Disk portion 12-1 may contain a clear central window 12-1W and a ring-shaped housing 12-1H. Inner disk portion 12-1 may be attached to a supporting structure such as display 14. For example, magnets 32 in portion 12-1 of knob 12 (e.g., in housing 12-1H) may be magnetically coupled to magnets 44 in device 48.

A user may rotate outer ring portion 12-2 in clockwise direction 20 or counterclockwise direction 18 to adjust the operation of a system operating parameter for system 10 (e.g., media playback volume, display brightness, thermostat temperature setting, etc.). An encoder such as encoder 62 may be used to monitor encoder index structures 66 as a user rotates ring portion 12-2. This allows encoder 62 to determine the current rotational position of ring portion 12-2. Encoder 62 may be a magnetic encoder, an optical encoder, an electrical encoder (e.g., a conductive encoder), or other suitable encoder. During operation, encoder 62 may interact with encoder index elements 66 on rotatable ring portion 12-2 to monitor the rotation of ring portion 12-2. For example, in a magnetic encoder arrangement, encoder index elements 66 may be magnets and encoder 62 may use a magnetic sensor to monitor the movement of the magnets past encoder 62. In an optical encoder arrangement, encoder 62 may contain a light-emitting diode or other light source and a light detector. Index elements 66 in an optical encoder arrangement may be reflectors that reflect emitted light from the light-emitting diode towards the light detector. By monitoring peaks in the reflected light signal, the optical encoder can measure the position (angular rotation) of knob 12. With an electrical encoder arrangement, conductive metal strips or other elements may be arranged around ring portion 12-2 and encoder 62 may contact these elements to make conductivity (resistance) measurements to determine the angular orientation of portion 12-2. Encoder data may be used to determine knob rotational information such as angular orientation. Angular orientation data may be processed to determine angular velocity, direction of rotation, angular acceleration, etc.

Encoder output (e.g., information on knob angular orientation, etc.) may be conveyed from knob 12 to device 48 using wireless communications circuitry 26 and 36. For example, circuitry 26 may contain radio-frequency transceiver circuitry that wirelessly transmits encoder information and circuitry 36 may contain corresponding radio-frequency transceiver circuitry that wirelessly receives the encoder information. Circuitry 36 may process the received encoder information and may take suitable action (e.g., the operation of system 10 may be adjusted, information that is being displayed on display 14 may be updated, etc.).

Figure 3:
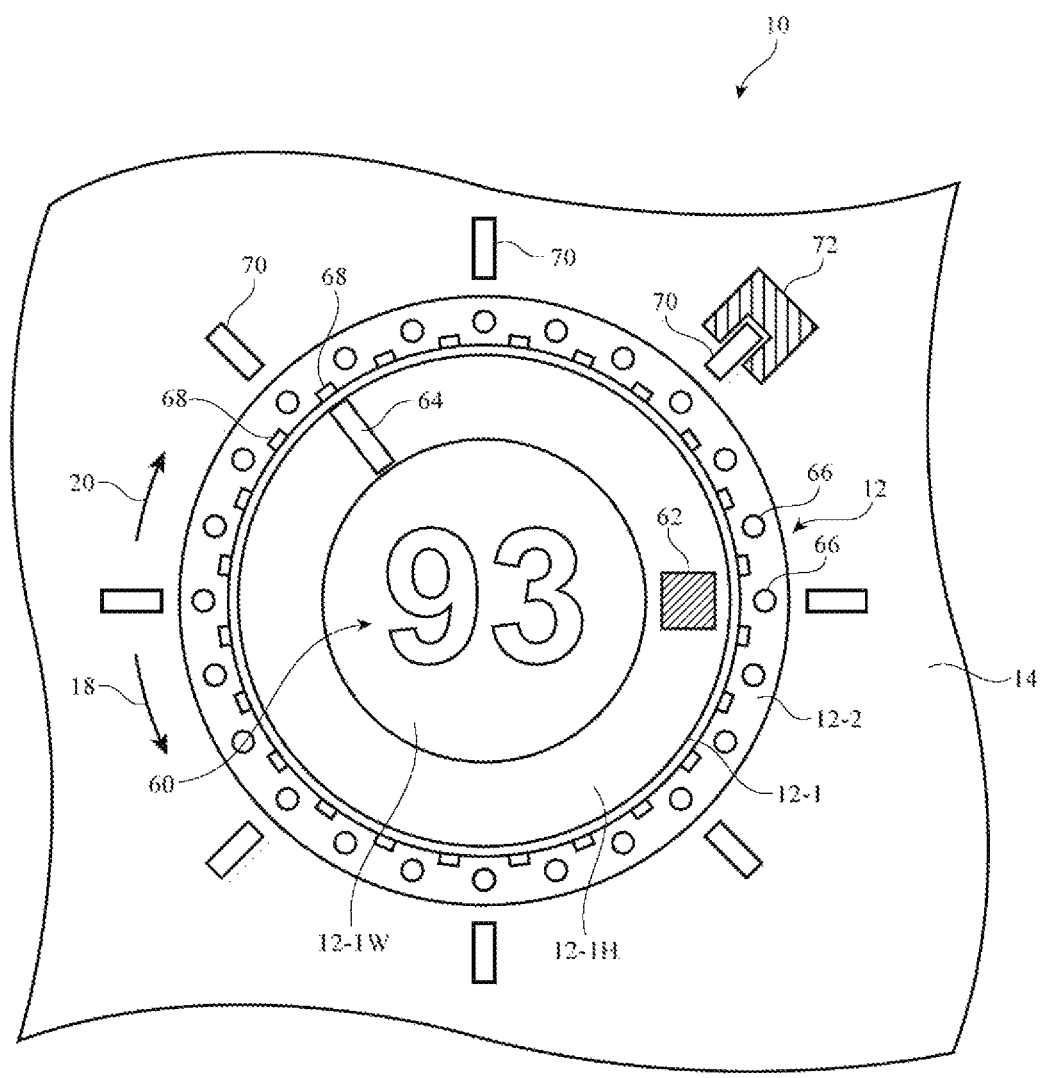
FIG. 3 is a view of an illustrative repositionable control device such as a repositionable knob on a display that is displaying a customized knob scale and associated text in accordance with an embodiment.

Knob 12 may have adjustable detents. The adjustable detents may be formed by driving knob 12 with an adjustable motor (directly or through a transmission), by controlling the strength of detents by adjusting electromagnet strength, by adjusting mechanical friction produced by interaction between an actuator and a moving friction pad or gearing system, and/or using other suitable adjustable detent components. As shown in FIG. 3, for example, magnets 68 or other detent elements may be arranged around the periphery of ring portion 12-2. Electromagnet 64 may produce a magnetic field that interacts with magnets 68. As ring 12-2 is rotated, magnets 68 pass through the electric field, creating detents. The strength of the detents may be adjusted by adjusting the electric field strength of electromagnet 64. Moreover, haptic feedback (e.g., accentuated thumps, clicks, or other types of vibration) may be produced each time ring portion 12-2 rotates by a given amount (e.g., each time ring 12-2 passes through a detent, electromagnet 64 may produce one or more pulses of magnetic field to accentuate the detent effect). Other types of haptic feedback and/or adjustable detent strength may be produced using electromagnet 64, if desired. Moreover, vibrators (e.g., asymmetric weight vibrators), piezoelectric actuators, electroactive polymer actuators, and/or other adjustable detent and/or adjustable haptic output devices may be used in knob 12. The use of an electromagnet that interacts with magnets on ring portion 12-2 is merely illustrative. If desired, magnets 68 may be monitored by encoder 62 (e.g., magnets 68 may serve as index elements 66).

Components such as rotary encoder 62 for measuring the angular orientation of knob ring portion 12-2 relative to inner disk portion 12-1 and adjustable haptic output and detent device 64 may be mounted in housing portion 12-1H of inner disk portion 12-1. Components such as input-output devices 34, control and communications circuitry 26, wireless power receiver 28, battery 30, and magnets 32 may also be mounted in housing portion 12-1H. If desired, encoder 62 may be a photodetector that is mounted in ring portion 12-2 and that is oriented inwardly to monitor light from markings displayed at predetermined positions under ring portion 12-2 by display 14. The markings (e.g., a ring of encoder marks such as bars or dots, etc.) can be monitored by the photodetector to determine how ring 12-2 is being rotated. With this type of arrangement, the markings or other optical encoding information displayed by display 14 can be dynamically altered to change the behavior of knob 12.

Inner window portion 12-1W of inner disk 12-1 may be attached to ring housing 12-1H and may remain stationary as portion 12-2 is rotated around disk 12-1. Window 12-1 may be formed from one or more transparent layers such as one or more layers of clear glass, clear plastic, a clear touch screen display or a clear touch sensor layer without a display, and/or other layers. The transparency of window 12-1W may be used to allow display 14 to display text and other content to a user. In the example of FIG. 3, text 60 is visible through window 12-1W. If desired, window portion 12-1W may be formed from an opening that does not include any structures. With this type of arrangement, the graphics, text, or other content that is displayed by display 14 may be viewed by the user through the opening.

Content such as graphics or text 60 may be used to display information on a parameter associated with the use of knob 12 and system 10. For example, if knob 12 is being used to adjust playback volume in a media system in a vehicle or home, text 60 may contain a number or icon that indicates the current playback volume setting for the system. If, as another example, knob 12 is being used to adjust a thermostat in a vehicle or home, text 60 may be used to display the current thermostat temperature setting.

Scale marks such as tick marks 70 may also be displayed around the perimeter of ring 12-2 by display 14. A current rotational position indicator such as indicator 72 may be moved among tick marks 70 in response to rotation of knob 12 and may correspond to the current value displayed by text 60 or other suitable value (i.e., indicator 72 may be place adjacent to one of tick marks 70 to indicate the current setting of knob 12). Tick marks 70 may be labeled with numbers (e.g., 1 . . . 10), may be labeled with text, may be labeled with icons, or may be labeled with other information. When a user repositions knob 12, system 10 can sense the new location of knob 12 and can update the locations of tick marks 70, position indicator 72, and text 60, accordingly (e.g., so that tick marks 70 continue to run around the periphery of ring 12-2, so that text 60 is still visible through window 12-1W, etc.).

Figure 4:
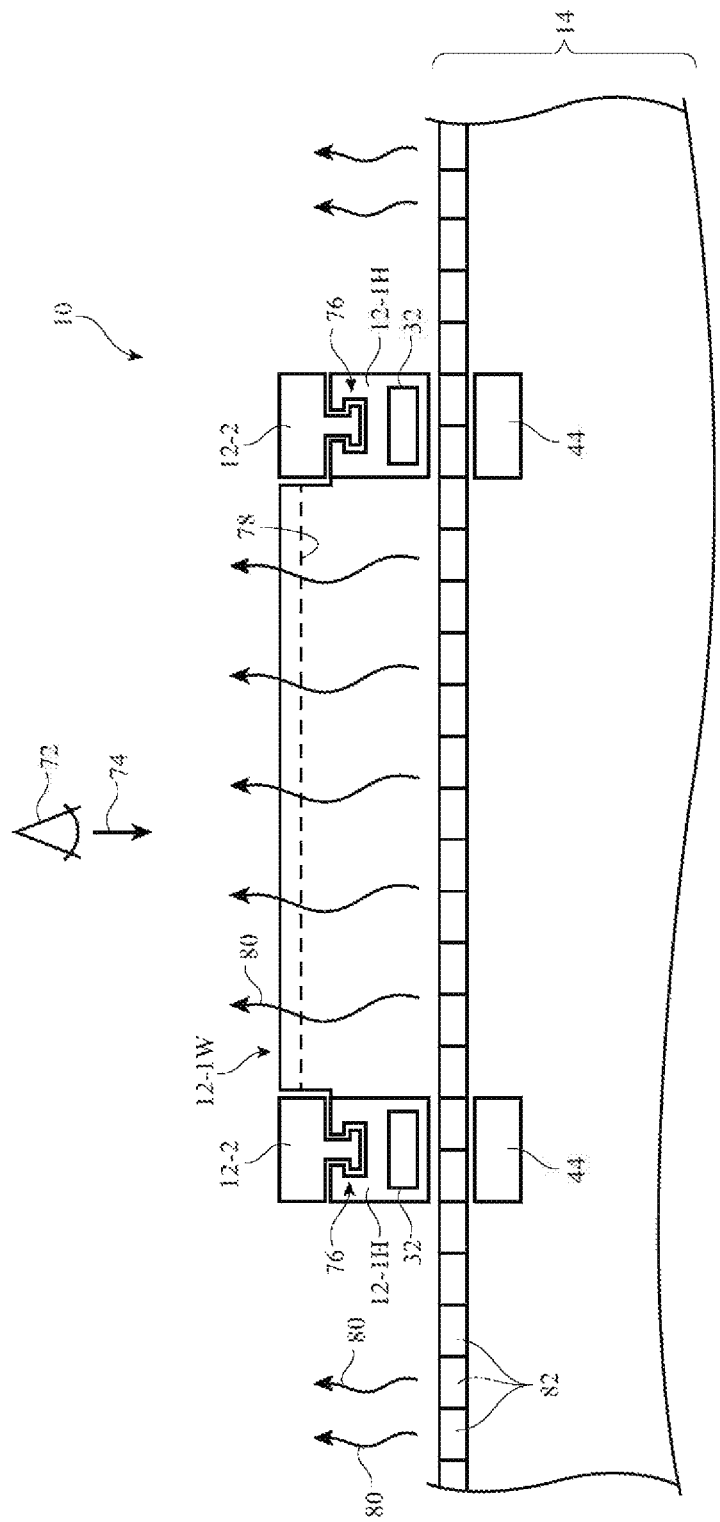
FIG. 4 is a side view of a repositionable knob on a display in accordance with an embodiment.
Figure 5:
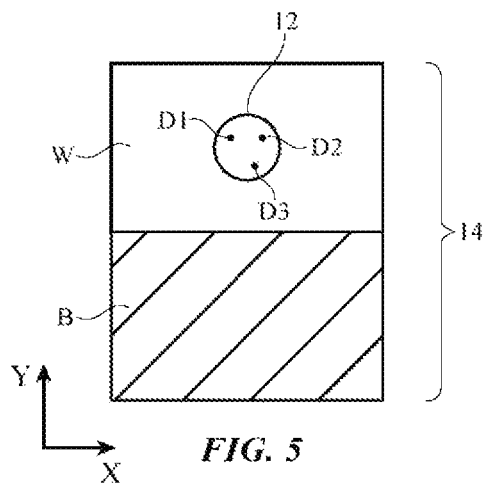
FIGS. 5, 6, 7, 8, and 9 are views of an illustrative display and repositionable control device showing how the display may be illuminated using a time-varying search pattern to help determine the location of the repositionable control device on the display in accordance with an embodiment.

A cross-sectional side view of an illustrative repositionable knob attached by magnets to the surface of display 14 is shown in FIG. 4. In the example of FIG. 4, ring 12-2 is coupled to housing 12-1H by bearings 76 so that ring 12-2 may rotate with respect to housing 12-1H. Housing 12-1H may contain magnets 32 (or iron bars or other magnetic material) that are attracted to magnets 44 in display 14 (or iron bars or other magnetic material). Magnets 44 may be mounted under an array of pixels in display 14 such as pixels 82. Pixels 82 may emit light 80 (e.g., light for knob scale marks, light for a knob position indicator, light for content 60 of FIG. 3 that passes through window 12-1W, etc.). Window 12-1W may be transparent so that a user such as viewer 72 who is viewing knob 12 in direction 74 may view content 60 through window 12-1W. Window 12-1W may be mounted in housing 12-1H and may have a transparent touch sensor such as touch sensor 78 (e.g., an array of capacitive touch sensor electrodes formed from indium tin oxide or other transparent conductive material). A user may supply touch input to touch sensor 78 in response to content displayed by pixels 82 under window 12-1W or in response to information displayed on a display (e.g., a transparent display) that is overlapped by sensor 78. For example, if pixels 82 are configured to display a play icon under window 12-1W, a user may press on sensor 78 to initiate the playback of media content. In this scenario, the user may rotate ring portion 12-2 to adjust media playback volume after initiating media playback.

It may be desirable to determine the position of knob 12 on display 14 and/or the angular orientation of knob 12 on display 14. With this knowledge, system 10 can display scale marks 70 in appropriate locations, can display rotational position indicator 72 correctly, and can display information 60 in the center of knob 12 as desired. Information on the location of knob 12 on display 14 may also be used to adjust the operation of knob 12. For example, display 14 may have first and second regions. When a knob is placed in the first region, system 10 may recognize the knob as being a media playback control knob. When the knob is placed in the second region, system 10 may recognize the knob as being a thermostat control knob. A user may place different knobs in different regions and/or can move a single knob (or set of knobs) between different areas of display 14 to adjust the way in which knobs 12 are used in controlling system 10.

In general, any suitable technique may be used for monitoring the position of knob 12 on display 14 or other surface. As an example, equipment in display 14 or other mounting surface may make measurements to determine the location of knob 12. With this approach, knob 12 may contain magnets that emit magnetic fields, light sources that emit light, light reflectors that reflect light, metal structures that influence electromagnetic signals in predetermined ways (e.g., metal patches that produce known changes in capacitance, coils that produce known changes in radio-frequency impedance, etc.), vibrating devices that produce acoustic signatures, or may contain other structures that allow the position of knob 12 to be monitored by sensors in input-output devices 40 of device 48. Sensors in devices 40 may include, for example, sensors that make magnetic measurements, light readings, temperature measurements, capacitance measurements, radio-frequency measurements (e.g., to determine the location of a coil in wireless circuitry, to determine the location of a near-field communications antenna, etc.), acoustic measurements, or other measurements. Once sensor data that reveals the location and orientation of knob 12 has been gathered, circuitry 36 and/or other circuitry in system 10 may take suitable action (e.g., tick marks and other display output can be updated, knob encoder information can be gathered and used to adjust system operation, etc.).

With another illustrative approach, sensors in input-output devices 34 of knob 12 may make measurements (e.g., magnetic measurements, light readings, temperature measurements, capacitance measurements, radio-frequency measurements, acoustic measurements, etc.). These measurements may be processed in knob 12 and/or in electronic device 48 to determine the location and position of knob 12.

If desired, device 48 may use display 14 to emit light (e.g., light in a time-varying search pattern) that is detected by one or more light sensors in knob 12 and/or device 48 can contain other components that are used to help knob 12 in ascertaining location. For example, device 48 may contain fiducials that a camera in knob 12 monitors to determine the location of knob 12 on device 48, device 48 may contain magnets that device 48 senses to determine the location of knob 12 on device 48, device 48 may contain haptic output devices that produce vibrations that knob 12 monitors with a microphone to determine the location of knob 12, device 48 may contain an antenna, wireless power transfer coil, or other component that emits electromagnetic fields that are sensed by a corresponding antenna or wireless power transfer coil in knob 12, etc. Once circuitry 26 gathers information using its sensors, circuitry 26 and circuitry 36 can communicate and cooperatively determine the location and orientation of knob 12 (e.g., circuitry 36 can receive sensor data from circuitry 26 and can process the received sensor data to determine position and orientation, etc.).

If desired, knob 12 can contain one or more light sensors (e.g., two light sensors or three light sensors) that monitor the light (light 80 of FIG. 4) produced by pixels 82. Device 48 can direct display 14 to emit light in known patterns (e.g., light in a time-varying pattern with predetermined intensity, color, timing, etc.). By comparing the known pattern of light being emitted by display 14 to corresponding sensor readings made with the light sensors in knob 12, the control circuitry of system 10 can identify the current location and orientation of knob 12.

Figure 6:
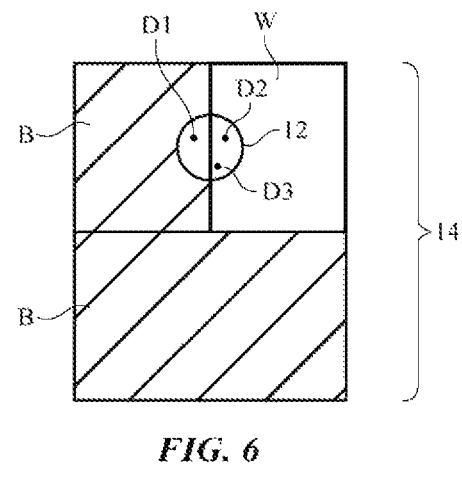
Figure 7:
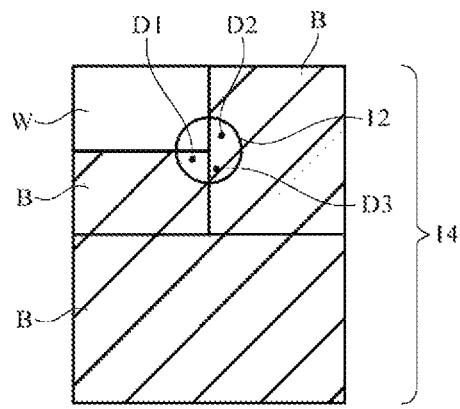
Figure 8:
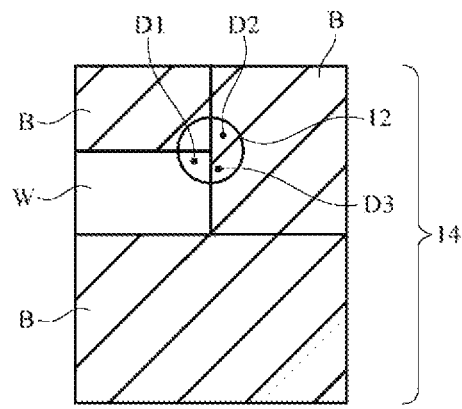
Figure 9:
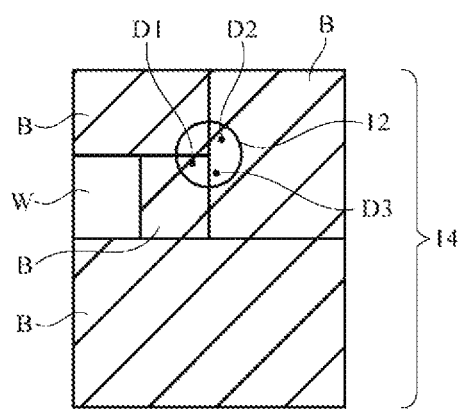

FIGS. 5, 6, 7, 8, and 9 illustrate how this type of process may be performed in a scenario in which display 14 emits light in a time-varying search pattern that implements a binary search and in which knob has three light sensors D1, D2, and D3 at three respective known locations within knob 12. These light sensors may include a photodetector that is serving as a light encoder (e.g., encoder 62) for measuring encoder marks on display 14 and/or may be formed from additional photodetectors. Initially, device 48 (e.g., control and communications circuitry 36) directs display 14 to display a pattern of light pixels (W) and dark pixels (B) on respective upper and lower halves of display 14. In this example, detectors D1, D2, and D3 are initially all in light pixel region W so that all of these detectors detect light during the operations of FIG. 5. Based on this result, circuitry 36 can conclude that knob 12 is in the upper half of display 14 and may therefore divide the upper half of display 14 into respective left and right halves. As shown in FIG. 6, the right half of the upper display region may be illuminated (light region W) and the left half of the upper display region may be dark (dark region B). Sensors D2 and D3 are in light region W and therefore detect light during the operations of FIG. 6, whereas sensor D1 is in dark region B and does not detect light. Based on this result, circuitry 36 can conclude that sensors D2 and D3 of knob 12 are in the upper right quadrant of display 14 and detector D1 is in the upper left quadrant of display 14. FIGS. 7, 8, and 9 shows how this binary search algorithm may progress within increasingly finer granularity. During the operations of FIGS. 7, 8, and 9, progressively smaller regions of display 14 may be illuminated in order to identify the location of each of sensors D1, D2, and D3. Once each sensor is located, both the overall location and the angular orientation of knob 12 can be determined.

The search technique illustrated in FIGS. 5, 6, 7, 8, and 9 is merely illustrative. Other search patterns of light may be emitted by display 14, if desired. For example, different colors of light may be emitted (simultaneously or in sequence) in different portions of display 14 and sensors D1, D2, and D3 may be sensitive to different respective colors or may each be capable of measuring color. The use of colored regions may help lower search times. With another arrangement, a single pixel (or small cluster of pixels) may be illuminated at a time. The pixel may be scanned across the entirety of display 14 while sensors D1, D2, and D3 monitor for light input. Based on the times at which detectors D1, D2, and D3 measure light and the known times at which each pixel of display 14 is producing light in this time-varying search pattern, the locations of each of sensors D1, D2, and D3 on display 14 can be monitored.

Figure 10:
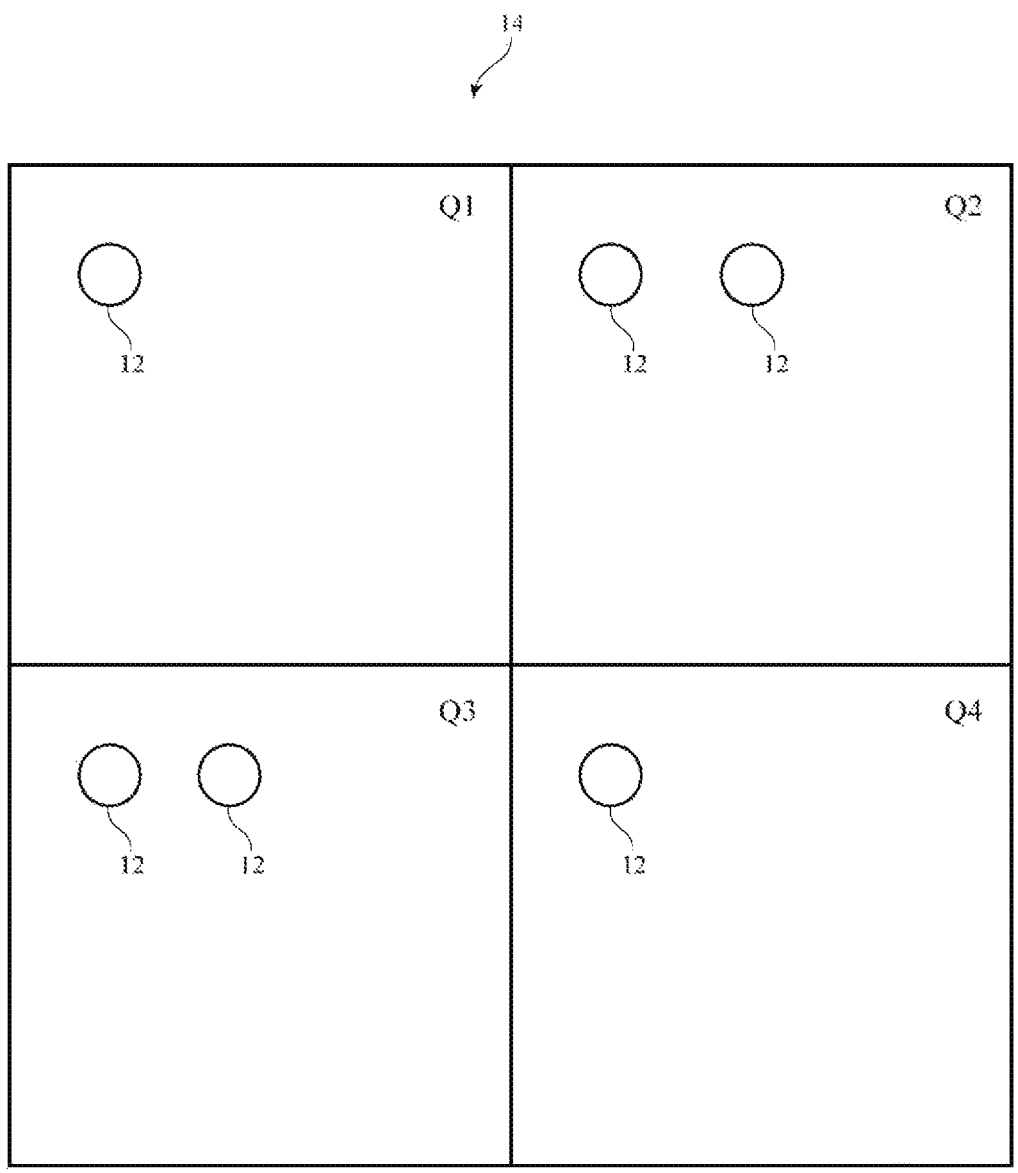
FIG. 10 is a view of an illustrative display having different regions associated with different repositionable control device functions in accordance with an embodiment.

FIG. 10 shows an illustrative arrangement for system 10 in which knobs 12 have been placed in different regions Q1, Q2, Q3, and Q4 of display 14. Upon determining the locations and orientations of knobs 12, system 10 can gather input from each of knobs 12 and can take appropriate action. For example, knobs 12 in region Q1 may be used to make volume adjustments (e.g., for different speakers in an audio system), knobs 12 in region Q2 may be used to make temperature adjustments to different climate zones, knobs 12 in region Q3 may be used to select between media sources, media tracks, and other media playback options, and knobs 12 in region Q4 may be used to adjust the intensities of lights associated with ambient lighting in system 10.

Figure 11:
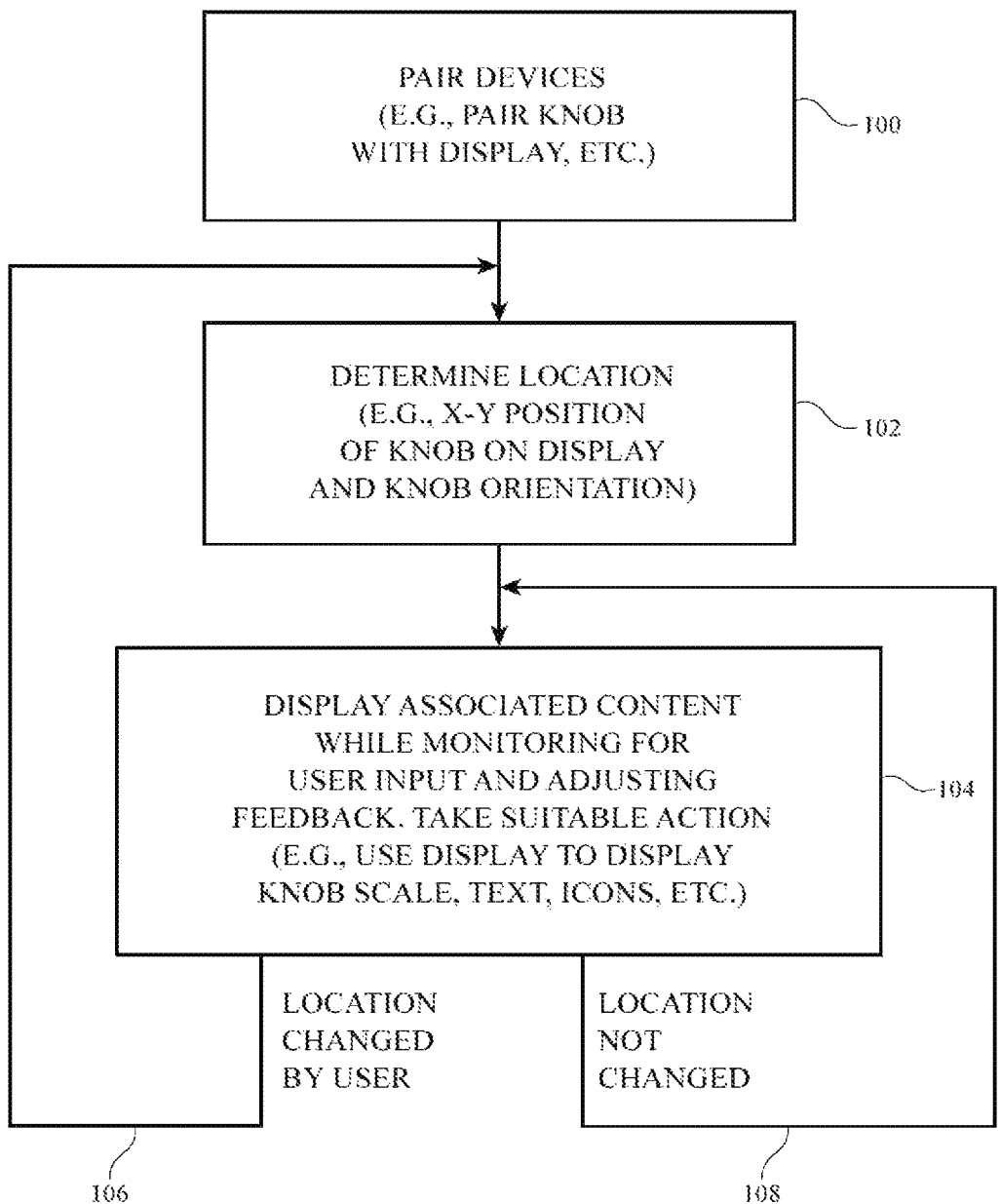
FIG. 11 is a diagram showing illustrative operations involved in operating a system with a repositionable control device such as a repositionable knob in accordance with an embodiment.

Illustrative operations involved in using knob 12 to control system 10 are shown in FIG. 11.

During the operations of block 100, the communications circuitry of knob 12 and device 48 may establish a wireless communications link. This allows knob 12 and device 48 to interact when identifying the location and orientation of knob 12 and allows encoder information on the angular orientation of knob 12 to be provided to device 48. If desired, passive knob arrangements may be used in which, for example, display 14 emits light (e.g., by modulating pixels under housing 12-1H, etc.) while using sensors under holes or transparent windows in display 14 to gather reflected modulated light from one or more reflective elements in ring 12-2). In passive knob arrangements, knob 12 need not include communications circuitry for communicating with device 48, because device 48 can ascertain the location, orientation, and knob rotational status of knob 12 without receiving data from circuitry in knob 12. Illustrative configurations for system 10 in which knob 12 contains control and communications circuitry 26 are described herein as an example.

After establishing a communications link between knob 12 and device 48 at block 100, a search process of the type shown in FIGS. 5-9 or other suitable process based on sensor readings may be used at block 102 to determine the location and orientation of knob 12 (e.g., the position of knob 12 and housing 12-1H in lateral dimensions X and Y and angular orientation from 0-360°). Encoder information may also be gathered.

Based on the known location and orientation of knob 12 (e.g., the angular orientation of housing 12-1H determined from detectors D1, D2, and D3, etc.), device 48 may, at block 104, use display 14 to display tick marks 70, mark 72, and/or other scale information around the periphery of knob 12, may display text or other content 60 through window 12-1W of knob 12, and may provide appropriate detent strength and haptic feedback strength as the user rotates knob 12.

During operation, system 10 may gather knob rotation information (e.g., information on the angular orientation of rotating outer ring 12-2 of knob 12) and may take suitable action based on the knob rotation information (e.g., to adjust media settings, home or vehicle climate control system settings, lighting settings, etc.). System 10 can periodically check that the location of knob 12 is as expected (e.g., by using the pixels under detectors D1, D2, and D3 to periodically send confirmatory light signals to detectors D1, D2, and D3). If the user moves knob 12, processing may loop back to the operations of step 102 as indicated by line 106, so that the location and orientation of knob 12 can be updated by system 10. If the location is not changed, processing may loop back to the operations of step 104 as indicated by line 108 so that knob rotational information may be gathered and appropriate actions taken based on the rotational information and/or other information (e.g., information on the current location of knob 12 on display 14, etc.).

Although sometimes described in the context of a rotatable knob, repositionable device 12 of system 10 may be a linear slider device, a pushbutton device, a touch sensor device (e.g., a touch sensor without rotating knob portions), and/or other suitable input-output device. The use of a rotatable knob is merely illustrative.

The foregoing is merely illustrative and various modifications can be made to the described embodiments. The foregoing embodiments may be implemented individually or in any combination.

What is claimed is:

1. A system, comprising:
an electronic device having:
a display with a surface and an array of pixels, and
electronic device control and communications circuitry configured to direct the pixels to emit light through the surface; and
a repositionable knob at a location on the surface of the display, the repositionable knob having:
a housing with magnets that magnetically attach the repositionable knob to the display,
a rotating portion that rotates relative to the housing,
an encoder in the housing that gathers angular orientation information indicative of an angular orientation between the rotating portion and the housing,
a light sensor that senses the emitted light, and
knob control and communications circuitry configured to provide information on the sensed emitted light to the electronic device control and communications circuitry, wherein the electronic device communications and control circuitry is configured to identify the location of the repositionable knob on the surface based on the information on the sensed emitted light.

2. The system defined in claim 1 wherein the repositionable knob includes at least two additional light sensors and wherein the light sensor and the at least two additional light sensors sense the emitted light while the electronic device control and communications circuitry directs the pixels to emit the light in a time-varying search pattern.

3. The system defined in claim 1 wherein the repositionable knob includes an electromagnetic actuator that provides adjustable detents as the rotating portion rotates relative to the housing.

4. The system defined in claim 3 wherein the repositionable knob has a transparent window and wherein at least some of the pixels in the array of pixels are viewable through the transparent window.

5. The system defined in claim 4 wherein the electronic device control and communications circuitry is configured to receive angular orientation information from the repositionable knob and wherein the repositionable knob includes a touch sensor.

6. The system defined in claim 1 wherein the electronic device control and communications circuitry is configured to wirelessly receive knob angular orientation information from the repositionable knob.

7. The system defined in claim 6 further comprising components that are controlled by the electronic device control and communications circuitry, wherein the electronic device control and communications circuitry is configured to adjust the components based at least partly on the received knob angular orientation information and based at least partly on the location of the repositionable knob on the surface.

8. The system defined in claim 7 wherein the electronic device control and communications circuitry is configured to direct the array of pixels to display a visible scale around the knob.

9. The system defined in claim 8 wherein the visible scale includes tick marks and wherein the electronic device control and communications circuitry is configured to display a current rotational position indicator adjacent to one of the tick marks that is indicative of the knob angular orientation.

10. A system, comprising:
an electronic device comprising a display with a surface, wherein the display is configured to display encoder marks;
a repositionable control device at a location on the surface of the display, the repositionable control device having a housing that is removably attached to the display and at least two light sensors in the housing, wherein the housing has a fixed portion and a rotating portion, wherein the at least two light sensors monitor the display encoder marks as the rotating portion rotates about the fixed portion, and a wireless power receiver in the housing that receives wireless transmitted power from the electronic device; and
control circuitry in the electronic device that is configured to direct the display to emit light through the surface using a predetermined time-varying pattern while the light sensors make measurements on the emitted light and that is configured to identify the location on the surface of the display based at least partly on the measurements on the emitted light by the light sensors, wherein the predetermined time-varying pattern includes regions of dark pixels and regions of bright pixels, and wherein a selected one of the regions of the dark pixels and the regions of the bright pixels extends across at least half of the display.

11. The system defined in claim 10 wherein the repositionable control device comprises magnets that magnetically attach the repositionable control device to the surface of the display.

12. The system defined in claim 11 wherein the repositionable control device has a transparent window through which the display is visible.

13. The system defined in claim 12 wherein the control circuitry is configured to display content through the transparent window using the display, wherein the content includes at least a selected one of: text and graphics.

14. The system defined in claim 13 wherein the repositionable control device comprises a rotatable knob with an encoder that gathers knob rotational information and wherein the control circuitry is configured to adjust the displayed text based at least partly on the knob rotational information.

15. The system defined in claim 10 wherein the repositionable control device comprises a rotatable ring portion with electromagnetically controlled detents.

16. The system defined in claim 10 wherein the repositionable control device is a rotatable knob, wherein the rotatable knob includes wireless communications circuitry that wirelessly transmits the measurements on the emitted light, and wherein the rotatable knob includes a touch screen display.

17. A repositionable knob configured to be magnetically mounted on a display surface associated with a display, wherein the display is configured to display encoder marks, comprising:
a housing containing wireless power receiver circuitry that is configured to receive wirelessly transmitted power;
a touch screen display mounted in the housing;
a rotating portion that rotates relative to the housing;
a photodetector on the rotating portion that monitors the display encoder marks as the rotating portion rotates; and communications circuitry that wirelessly transmits knob rotational information indicative of an angular orientation of the rotating portion relative to the housing.

18. The repositionable knob defined in claim 17 further comprising:
light sensors in the housing that are configured to sense light emitted from the display;
magnets in the housing that magnetically mount the housing on the display;
a transparent window portion through which light from the display passes when the housing is magnetically mounted on the display by the magnets; and
a capacitive touch sensor.

* * * * *